United States Patent [19]

Blood

[11] Patent Number: 4,613,866
[45] Date of Patent: Sep. 23, 1986

[54] THREE DIMENSIONAL DIGITIZER WITH ELECTROMAGNETIC COUPLING

[75] Inventor: Ernest B. Blood, Burlington, Vt.

[73] Assignee: McDonnell Douglas Corporation, St. Louis, Mo.

[21] Appl. No.: 494,292

[22] Filed: May 13, 1983

[51] Int. Cl.[4] .......................... G01S 5/04; G01B 7/14
[52] U.S. Cl. .................................. 343/448; 343/451; 324/208; 324/461
[58] Field of Search ............... 343/451, 448, 452, 463; 324/208, 247, 256, 261

[56] References Cited

U.S. PATENT DOCUMENTS

| | | | |
|---|---|---|---|
| 3,178,717 | 4/1965 | Fengler | 346/33 |
| 3,391,392 | 7/1968 | Doyle | 340/172.5 |
| 3,473,157 | 10/1969 | Little et al. | 340/172.5 |
| 3,502,882 | 3/1970 | Von Voros | 250/202 |
| 3,534,396 | 10/1970 | Hart et al. | 235/61.6 |
| 3,725,760 | 4/1973 | Bailey | 318/568 |
| 3,868,565 | 2/1975 | Kuipers | 324/34 R |
| 3,936,712 | 2/1976 | Gerber et al. | 318/568 |
| 3,970,831 | 7/1976 | Hegyl | 235/151.1 |
| 3,982,165 | 9/1976 | Rich | 318/568 |
| 3,983,474 | 9/1976 | Kuipers | 324/43 R |
| 4,017,858 | 4/1977 | Kuipers | 343/100 R |
| 4,054,881 | 10/1977 | Raab | 343/451 |
| 4,058,849 | 11/1977 | Fitzgerald et al. | 364/520 |
| 4,105,937 | 8/1978 | Tuda et al. | 318/568 |
| 4,115,684 | 9/1978 | Lindbom | 219/124.22 |
| 4,130,873 | 12/1978 | Floretta et al. | 364/513 |
| 4,132,938 | 1/1979 | Sano et al. | 318/568 |
| 4,187,454 | 2/1980 | Ito et al. | 318/568 |
| 4,283,764 | 8/1981 | Crum et al. | 364/513 |
| 4,287,809 | 9/1981 | Egli et al. | 89/41 EA |
| 4,298,874 | 11/1981 | Kuipers | 343/112 R |
| 4,300,122 | 11/1981 | McMahon | 340/146.3 |
| 4,300,198 | 11/1981 | Davini | 364/513 |
| 4,302,097 | 11/1981 | Chlestil | 355/52 |
| 4,314,251 | 2/1982 | Raab | 343/112 R |
| 4,328,548 | 5/1982 | Crow et al. | 364/449 |
| 4,346,384 | 8/1982 | Raab | 343/112 R |
| 4,396,885 | 8/1983 | Constant | 343/451 |

OTHER PUBLICATIONS

SAC Technical Bulletin GP-6-CRT 3.81.

Primary Examiner—Theodore M. Blum
Assistant Examiner—Gregory C. Issing
Attorney, Agent, or Firm—Price, Heneveld, Huizenga & Cooper

[57] ABSTRACT

A three dimensional digitizer is provided for determining and digitizing the coordinates of a three dimensional object. A hand-held stylus is used for tracing and determining points of interest on the surface of the object. A plurality of antennas for radiating electromagnetic energy are provided, the antennas being embedded in a table having a work surface upon which the object is placed. The radiating antennas have independent components which define a reference coordinate frame. A transmitter applies electrical signals to the radiating antennas which generate a plurality of distinguishable radio frequency electromagnetic fields. The stylus is provided with a projection for defining a point of contact between the stylus and the surface of the object of interest. A plurality of receiving antennas are disposed in the stylus. The receiving antennas have a known relationship with the projection and the point of contact on the object. The receiving antennas are provided with a plurality of independent components for detecting each of the transmitted electromagnetic fields. The output of the receiving antennas is supplied to an analyzer which converts the components of the electromagnetic fields received by the receiving antennas into the remote position and orientation of the receiving antennas relative to the reference coordinate frame. Since the point of contact of the stylus and the receiving antennas are provided with a known relationship, the coordinates of the surface of the three dimensional object touched by the stylus are also determined in the analyzer.

35 Claims, 11 Drawing Figures

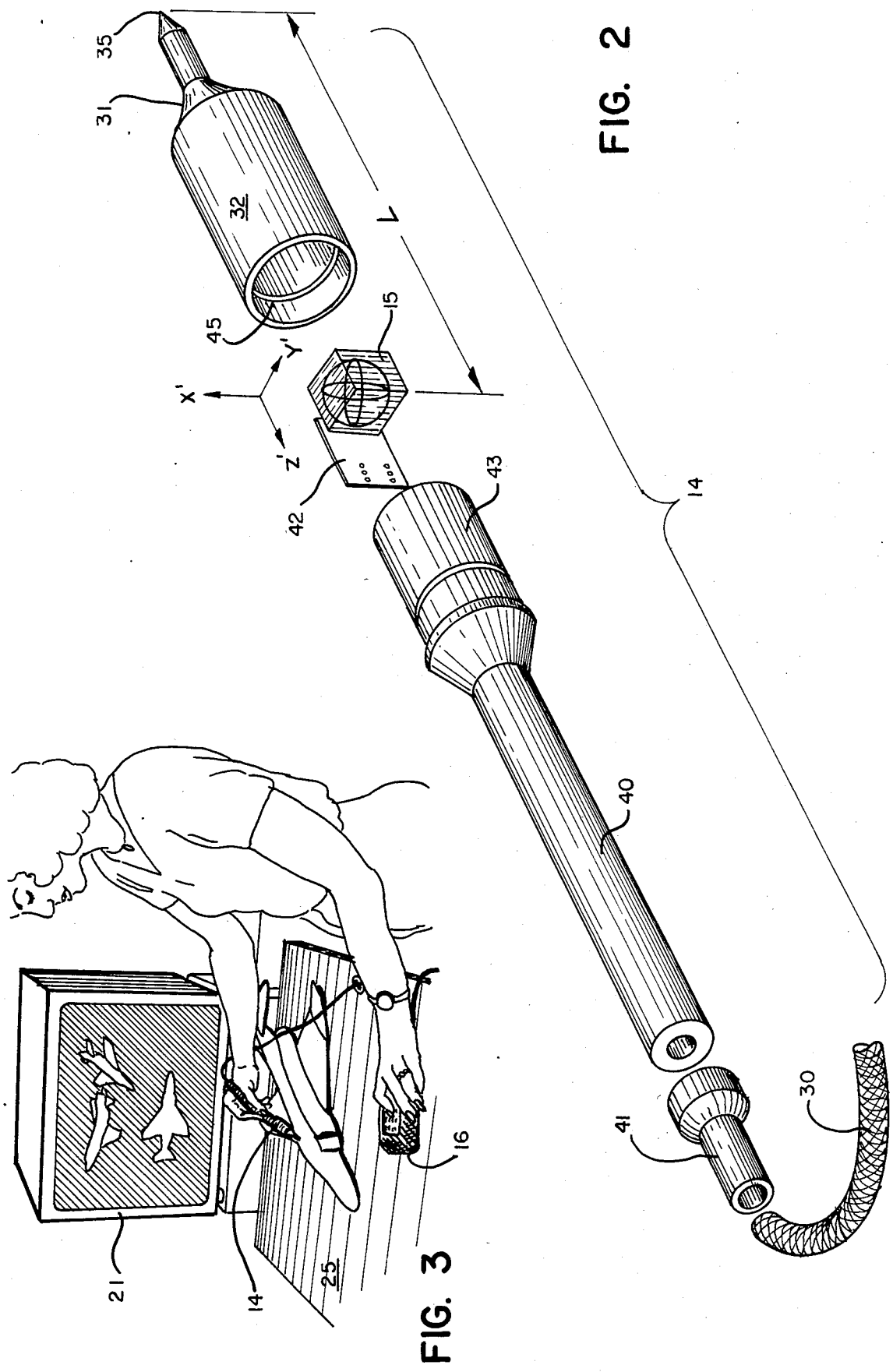

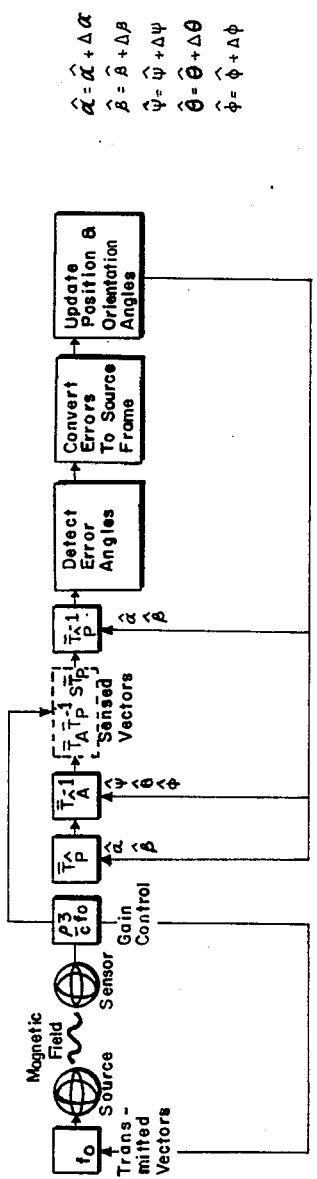
FIG. 9
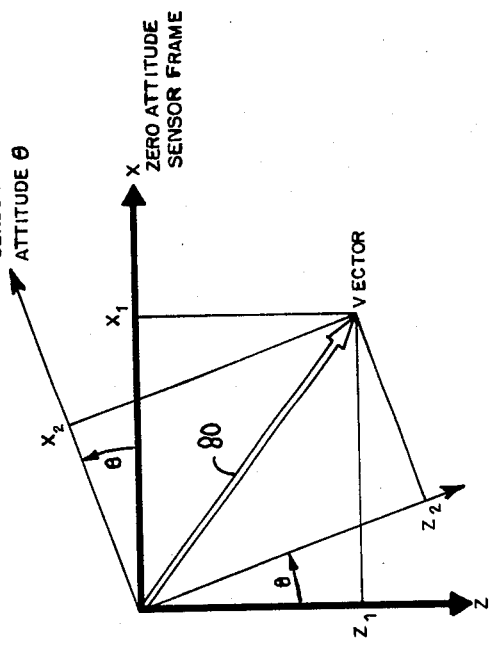
FIG. 8
FIG. 7

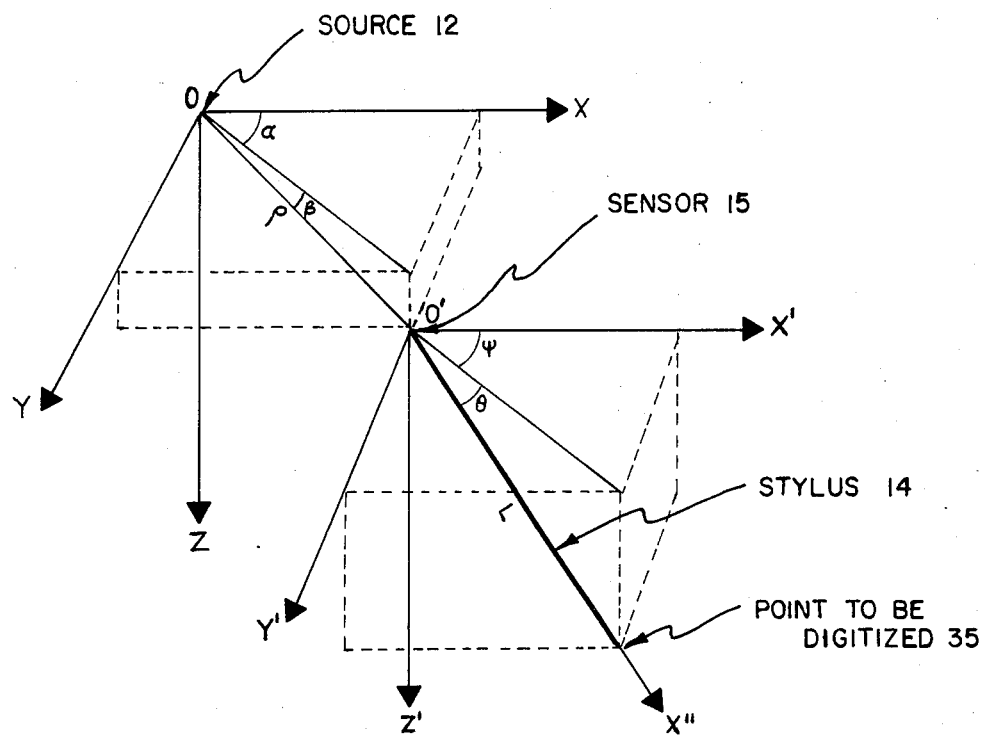
FIG. 10 POSITION AND ORIENTATION COORDINATE SYSTEMS WITH STYLUS
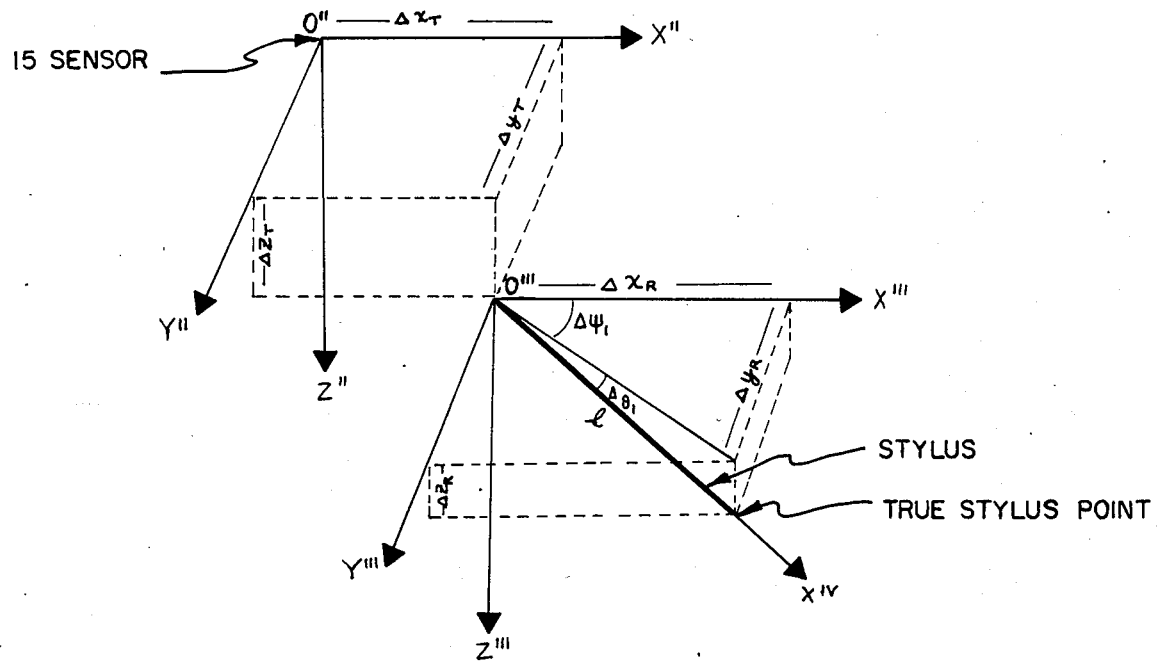
FIG. 11 SENSOR/STYLUS ASSEMBLY ERRORS

THREE DIMENSIONAL DIGITIZER WITH ELECTROMAGNETIC COUPLING

BACKGROUND OF THE INVENTION

The invention relates generally to devices for digitizing the coordinates of a three dimensional object. More particularly, it is directed to such a three dimensional digitizer that employs an electromagnetic coupling.

Apparatus for digitizing the coordinates of a two dimensional drawing with an electromagnetic coupling are known in the prior art. Such prior art drafting and digitizing apparatus comprises an automatically controlled carriage that is translated over a drawing support surface of a digitizing and plotting table. A cursor is disposed on the carriage for tracing a drawing disposed on the support surface, the cursor having a pair of electromagnetic coils which are used to produce signals indicative of the relative position of the carriage and cursor during the digitizing mode of operation. However, such devices are capable of monitoring a cursor having only two degrees of freedom. Since the orientation of the cursor relative to the work surface must remain fixed, these devices are incapable of digitizing the coordinates of a three dimensional model. While other devices are found for accomplishing three dimensional digitizing, these devices employ optical couplings, acoustic couplings, manual measurements, or measurements using potentiometers and the like for determining the coordinates of the three dimensional model. Prior art three dimensional digitizers do not feature electromagnetic couplings between the tracing device and a processor.

The art of tracking objects with electromagnetic radiation is highly developed. Such systems have been used, for example, for guiding an aircraft to a landing site, guiding an excavating device, tracking targets and aiming military ordinance. In the latter case, the source of electromagnetic radiation is fixed with respect to the frame of an aircraft and the receiver is mounted in the pilot's helmet in a calibrated relationship with respect to a helmet mounted reticle. The analyzing means associated with the receiver repetitively calculates the position and orientation of the pilot's head with respect to the air frame, and the pilot visually designates and/or tracks a target with the helmet mounted reticle to initially aim the computer guided ordinance which is released from the aircraft.

SUMMARY OF THE INVENTION

According to the present invention, a device for digitizing the coordinates of a three dimensional model is provided comprising a hand directable stylus coupled with electromagnetic radiation to a reference coordinate frame, the stylus being connected to a remote processor, or analyzer, which is capable of determining the position and orientation of the stylus relative to the reference coordinate frame with six full degrees of freedom. In one exemplary application, the digitizer of the present invention is used to automate the process of taking data points off of a scale model of a process piping facility for the generation of isometric drawings and material lists. A second common application of the digitizer is to convert object models into visual displays in a computer generated imagery system.

The digitizer comprises a plurality of radiating antennas having independent components which define a reference coordinate frame. The radiating antennas are preferably embedded in a nonconductive table defining a work surface upon which a three dimensional model or object is placed. A transmitter is provided for applying electrical signals to the plurality of radiating antennas which generate a plurality of distinguishable electromagnetic fields. A stylus is provided for tracing the surface of the three dimensional object. The stylus is provided with a projection or point for defining points of contact between the stylus and the surface of the three dimensional object being investigated. A plurality of receiving antennas are disposed in the stylus. The receiving antennas are provided with a predetermined known relationship with the point of contact with the three dimensional object. The receiving antennas has a plurality of independent components for detecting each of the transmitted electromagnetic fields. The output of the receiving antennas is directed to an analyzer or computer for converting the components of the transmitted electromagnetic fields received by the receiving antennas into remote object position and orientation information. Since the relationship between the receiving antennas and the point of contact of the stylus are known, the coordinates of the surface being traced are thus determined. Switching apparatus such as a foot switch and/or a keyboard is also connected to the analyzing means for enabling the digitizing of the coordinates of the three dimensional object touched by the stylus and/or labelling the coordinates for further processing. The digitizer can become a powerful tool in the hands of a designer. A classic application for the device involves the layout of piping in large chemical or fluid processing plants. A scale model of the facility can be used by the designer to trace piping drawings and make up material lists with a substantial decrease in the labor required for such tasks. In another classic application for the digitizer of the present invention, scale models of an object can be quickly traced to generate isometric, plan, elevational, or side views of the object and to convert the coordinates of the object models into a database for visual display in a computer generated imagery system.

BRIEF DESCRIPTION OF THE DRAWINGS

FIG. 2 is an exploded assembly of the stylus forming a portion of the three dimensional digitizer of the present invention.

FIG. 3 is a perspective view of the three dimensional digitizer of the present invention used to reduce a three dimensional model of an aircraft into a plurality of computer generated isometric images of the aircraft.

FIG. 7 illustrates a magnetic field vector $\overline{V}_2$ at a position P is a dipole magnetic field $\overline{V}_1$.

FIG. 8 illustrates the sensor transfer function for a sensor related through an elevational angle $\theta$.

FIG. 9 is a flow diagram illustrating the computation strategy of the three dimensional digitizer of the present invention.

FIG. 10 illustrates the relationship between a three-axis source and a corresponding three-axis sensor having a stylus of length L with a point to be digitized at 35. The source is located at 0 and defines the source reference frame X, Y, Z. The sensor is located at 0' with spherical coordinates $\alpha, \beta, \rho$ relative to the source coordinate frame.

FIG. 11 is a representation of each geometric source of error in the 3D digitizer of the present invention. The X", Y", Z" coordinate system is the same as the sensor reference frame represented in FIG. 10.

DESCRIPTION OF THE PREFERRED EMBODIMENTS

APPARATUS

Figure 1:
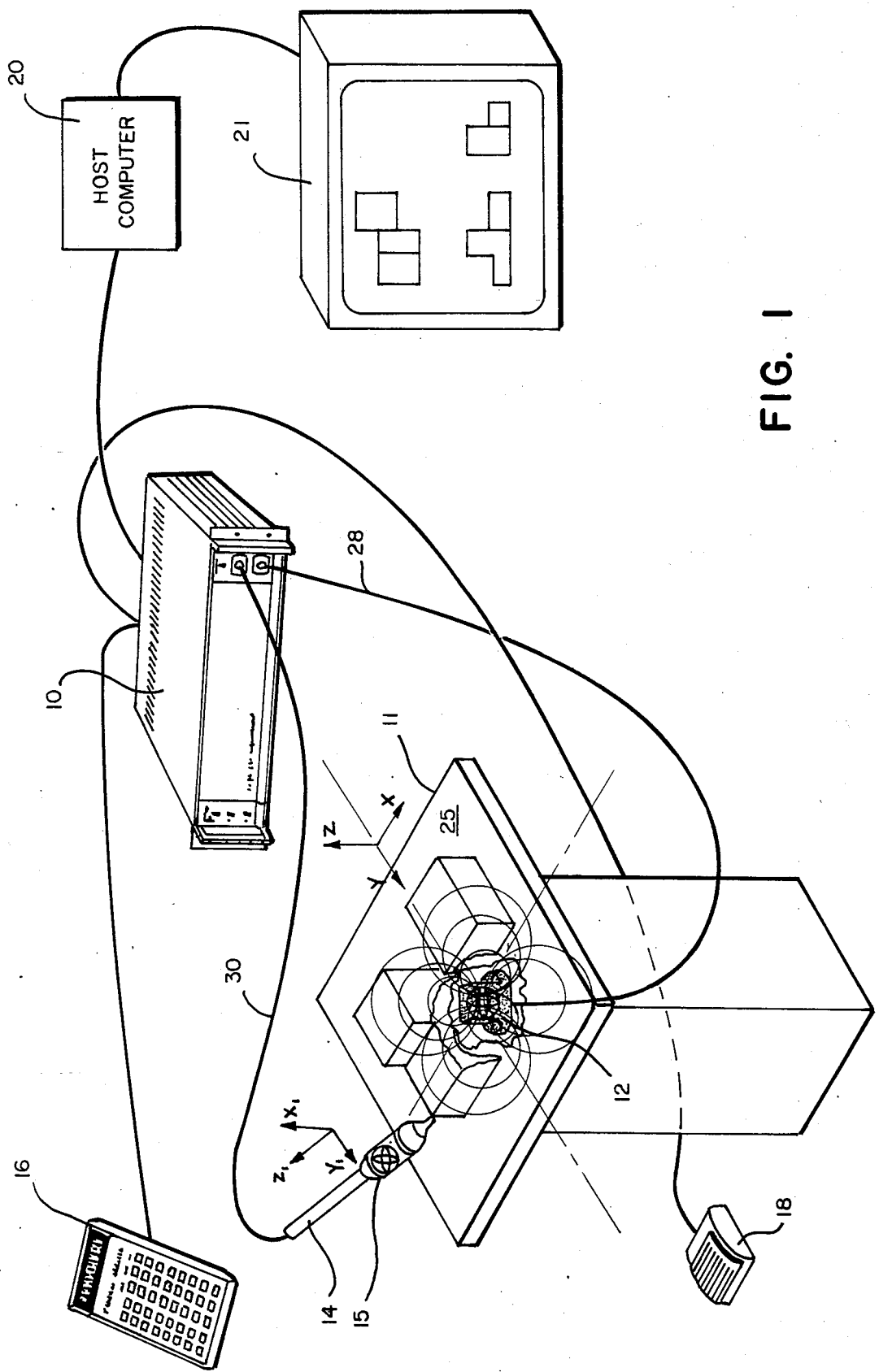
FIG. 1 is a perspective view of the three dimensional digitizer of the present invention.

With reference to FIG. 1, the three dimensional (3D) digitizer of the present invention is generally illustrated. The digitizer comprises an analyzing or computing unit 10, an object table 11, a source of electromagnetic radiation centered at 12, a stylus 14, including a plurality of receiving antennas at 15, a hand operated key pad 16 and a foot pad or foot switch 18. The output of the analyzer 10 is typically transmitted to a host computer 20 where various software packages can be used to transform the digitized coordinates to the object traced on the object table 10 into useful information such as layout drawings, perspective views, material lists or a database for future reference in a computer generated imagery system. Typically, the output of the host computer is inputted to a visual display means such as the CRT illustrated at 21.

A plurality of radiating antennas are associated with the object table 11. The radiating antennas preferably are disposed at 12, directly below the horizontal working surface 25 of the work table. The work table 11 is preferably formed from a nonmetallic nonconducting material that does not distort or interfere with the propogation of electromagnetic radiation from the source 12. The source 12 preferably comprises three independent loop antennas which each define a magnetic dipole field. The loops of the three antennas are oriented such that three orthogonal dipole magnetic fields are created, one of the fields being identified with one of the X, Y and Z axes of the work surface of the object table 11 such that the fields define a reference coordinate frame. The analyzer 10 includes a transmitter connected to the source 12, by lines schematically illustrated at 28, for applying to the three radiating loop antennas, electrical signals which generate the three dipole magnetic fields associated with the X, Y and Z directions, respectively. The electrical signals applied to the three loop antennas are multiplexed so that the resulting dipole magnetic fields are distinguishable from one another. A variety of multiplexing techniques including time division, frequency and phase multiplexing are suitable. The stylus 14 includes a plurality of receiving antennas at 15 for receiving components of the electromagnetic fields transmitted by the source 12. Preferably, the receiving antennas 15 also comprise three loop antennas. The three loop antennas disposed at 15 are oriented in mutually orthogonal directions so that the antennas define a sensor coordinate frame $X_1, Y_1, Z_1$. The output of the receiving antenna triad 15 is connected to the analyzer 10 by lines schematically illustrated at 30. Both the source 12 and the sensor 15 are constructed by winding three orthogonal coils about a ferrite core. The sensor measures approximately one eighth of a cubic inch or smaller while the source is generally larger, depending on the desired operational range of the system.

With refernce now also to FIG. 2, it is illustrated that the receiving antenna triad 15 is provided with a known relationship L with respect to a projection 31 disposed on the tip 32 of the stylus 14. The projection 31 on the stylus 14 may take a variety of configurations but preferably, provides a point of contact 35 which can be used to touch the surface of a three dimensional object and determine a point of contact between the stylus and the surface of the object. The stylus thus comprises a means for identifying the coordinats to be digitized. The analyzing means 10 converts the components of the electromagnetic fields received by the receiving antenna triad 15 into receiving antenna position and orientation information. Since the relationship of the receiving antenna 15 to the point 35 is known, the coordinates of the surface of the three dimensional object touched by the point 35 can also be determined.

Switching apparatus such as the keyboard 16 and the foot pad 18 are used to enable the digitizing apparatus once the operator chooses a point of interest on the three dimensional object. Normally, the foot pad 18 serves the purpose of enabling the digitizing apparatus and is most useful for this purpose when the hands of the user are otherwise occupied. The key pad 16 is used to display operating cues and to label or otherwise further characterize the points digitized for further reference or processing. The key pad 16 is also used to control the operating mode of the analyzer 10.

With specific reference again to FIG. 2, the stylus 14 comprises three components, the tip 32, the sensor 15, and the stem 40. The stem 40 comprises an elongate handle for allowing the user to manipulate the stylus in a pen or pencil-like fashion. The stem 40 receives the cable 30 for interconnecting the receiving antenna triad 15 and the analyzer 10 and includes rubber flex grommet 41 which the cable 30 passes through. The ends of the cable 30 are soldered or otherwise suitably secured to a printed circuit board 42 to make ohmic contact with the receiving antenna triad 15. The receiving antenna triad 15 slips within a bore provided in the barrel 43 of the stem 40 of the stylus. The tip 32 encompasses the barrel 43 of the stem 40 and a ridge 44 on the barrel 43 engages an annular groove 45 disposed within the tip 32 in a snap lock fashion so that the tip 32 can be replaced with one having a different shape. Preferably, the tip 32 is formed from a nonmetallic, nonconductive material such as nylon. Similarly, the stem 40, where possible, is also formed from nonmetallic, nonconductive materials.

Figure 4:
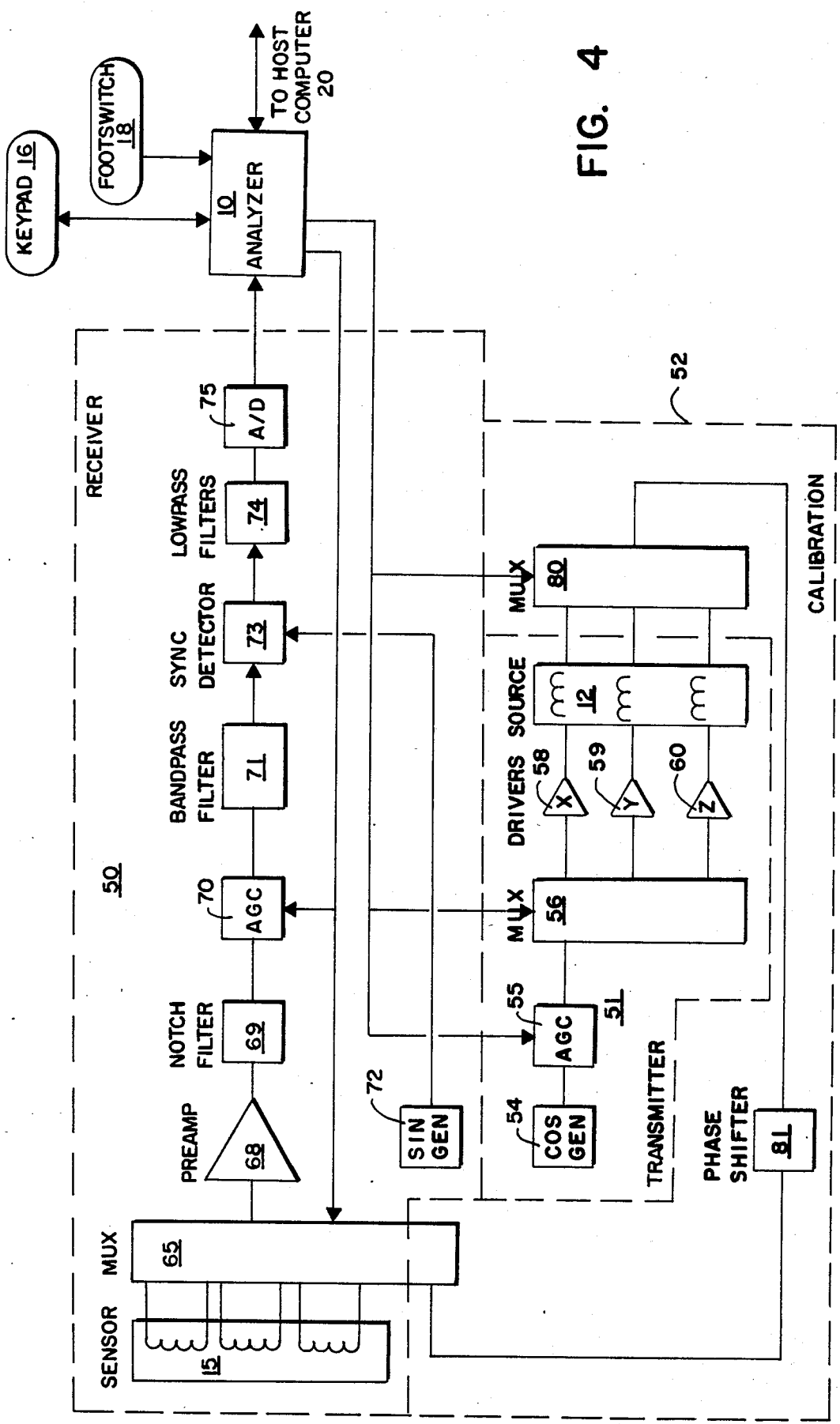
FIG. 4 is a schematic and block diagram of the three dimensional digitizer of the present invention.

A schematic and block diagram of the 3D digitizer of the present invention is illustrated in FIG. 4. The circuit is divided into three sections denoted by dashed lines, including the transmitter section 51, the receiver section 50 and calibration circuitry 52.

In the transmitter section 51, the signal transmitted by the source antenna triad 12 is generated by a digitally synthesized cosine generator 54 at a frequency of 10285.71 Hz. A computer-controlled automatic gain control (AGC) circuit 55, working in conjunction with the receiver AGC circuitry, adjusts the output voltage of a set of drivers 58, 59 and 60. This in turn varies the magnetic field generated by the source antenna triad 12. A multiplexer 56 selects which of the three drivers is on.

The three drivers 58, 59 and 60, are identical and are functionally equivalent to high power op-amp current sources. The current source loads are the three coils of the source antenna triad 12 and each one is capacitively tuned for 10285.71 Hz operation.

The receiver section 50 contains a differential input multiplexer 65 which selects one of the three coils of the sensor antenna triad 15 or a calibration signal for input to the rest of the receiver chain. This is followed by a low noise, high gain differential preamplifier 68. The signal is then passed through a notch filter 69, centered around the television horizontal sync frequency (approximately 15.75 kHz) to enable the 3D digitizer to work in close proximity to television sets. This is followed by another AGC stage 70 and a bandpass filter 71 centered around the system frequency of 10285.71 Hz. The output of the bandpass filter 71 is multiplied by a digitally-generated sine wave of 10285.71 Hz, generated at 72, in a synchronous demodulator 73. The sine wave is 90 degrees out of phase with the cosine generator 54 in the transmitter section 51. This is necessary because a complimentary 90 degree phase shift occurs between the transmission and reception of the 3D digitizer carrier. The output of the synchronous demodulator 73 is a wave form whose DC component represents the desired system information. This is filtered by a seven pole, low pass filter 74 and digitized by a twelve bit analog-to-digital (A/D) converter 75. The A/D converter's digital output is then processed by the analyzer 10.

The calibration circuitry 52 removes most of the residual errors from the analog chain. A four input differential multiplexer 80 selects drive currents for measurement. The signal selected is divided down so as not to overload the preamplifier and is phase shifted at 81 by 90 degrees. It is selected for preamplifier input by the receiver differential input multiplexer 65. Measuring the three driver currents in the receiver section 50 allows gain variations to be measured and therefore normalized in software. Selecting the analog ground allows measurement of DC offset through the receiver section. This too is removed in software.

ORIENTATION AND POSITION PROCESSING

The basic components of the system which determine the object and orientation of the stylus are the source of electromagnetic radiation 12, the sensor 15, which samples the electromagnetic fields, and the analyzer or computer 10, which performs all required control calculation and interfacing tasks. The source 12 generates three orthogonal fields which are well defined in the area of interest. The fields are sampled by the sensor 15 and the resulting data is processed to determine the position and orientation of the sensor relative to the three orthogonal fields. Antennas creating dipole fields are preferred since they are symmetrical and relatively easy to describe analytically. Since the separation distance between the transmitter and receiver in the present application is relatively small, the near field component, or magnetic component, of electromagnetic radiation is used. Three loop antennas which each provide a single magnetic dipole field are provided at the source 12. The three antennas at the source 12 are sequentially excited with an approximately 10 kHz carrier. This produces three orthogonal AC magnetic fields that induce signals in the three axes of the similarly constructed sensor 15. The spacer outputs are filtered, synchronously detected and digitized to produce nine measurements. Each receiving antenna produces three measurements, one from each of the transmitting antennas. The analyzer 10 then processes these measurements to determine the six position and orientation unknowns of the sensor relative to the source.

The design and operation of such remote object orientation and position determining systems is well defined in the prior art. Such systems have been used with either a far field or near field electromagnetic coupling as aircraft landing aids and as ordinance delivery systems for initially determining the line of sight of the pilot and directing computer guided ordinance to a desired target. Such systems are disclosed in prior U.S. Pat. Nos. 4,054,881 issued Oct. 18, 1977; 4,289,874 issued Nov. 3, 1981; 4,314,251 issued Feb. 2, 1982; 4,328,548 issued May 4, 1982; 4,346,384 issued Aug. 24, 1982; and 4,287,809 issued Sept. 8, 1981. The disclosures of these prior U.S. patents are hereby incorporated by reference. These prior patents teach how the components of the electromagnetic fields received by the sensing antenna triad 15 may be reduced to remote object orientation and position relative to the transmitting antenna triad 12.

A. BASIC EQUATIONS

Figures 5, 6:
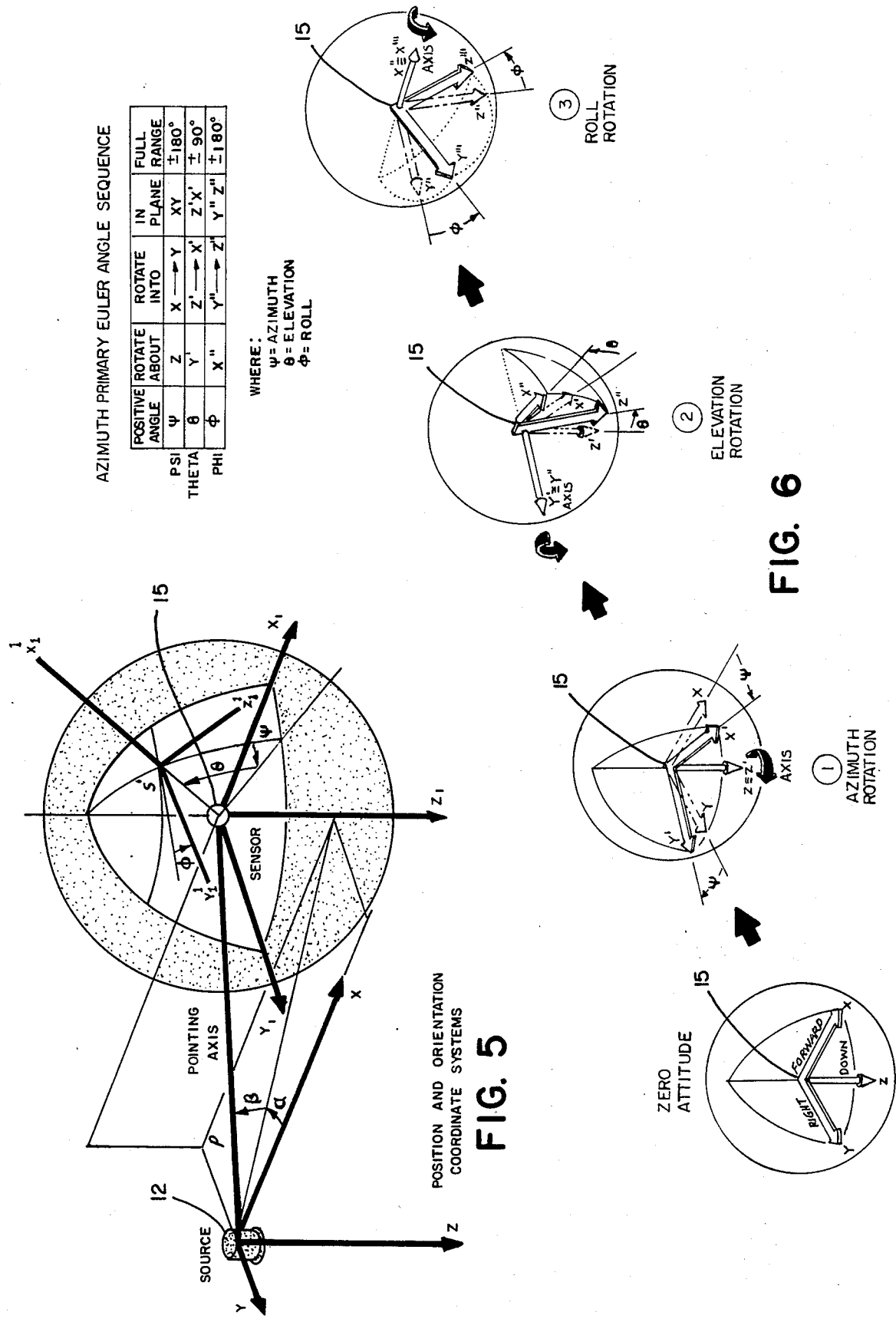
FIG. 5 illustrates the relationship between a three axis source and a three-axis sensor. The source reference frame X, Y, Z, is related to the sensor reference frame $X_1$, $Y_1$, $Z_1$, by spherical coordinates $\alpha, \beta, \rho$ and Euler angles $\psi, \theta, \phi$.
FIG. 6 illustrates the Euler angle sequence $\psi, \theta, \phi$ which defines the orientation of the sensor.

The 3D digitizer of the present invention is a closed loop, all attitude six degree of freedom, position and orientation measurement system that tracks the position and orientation of the sensor disposed on the stylus. The 3D digitizer of the present invention tracks the position and orientation of the sensor by determining small changes in the coordinates and then updating previous measurements. To accomplish this, the previous measurements are used to compute linear transformations that are approximately the inverse of those describing the true source-to-sensor coupling. With reference to FIG. 5, the position and orientation measurement system of the 3D digitizer operates cooperatively between two independent coordinate frames, that of the source 12 (X, Y, Z) disposed in the work table 11 and the sensor 15 ($X_1, Y_1, Z_1$) disposed in the stylus 14. The system measures the two angles $\alpha$, $\beta$, that define the direction to the sensor 15 from the source and the three Euler angles ($\psi, \theta, \phi$) that define the orientation of the sensor relative to the source. As well as determining these five angular measurements, the system also provides range ($\rho$) determination, or the distance between the source 12 and the sensor 15. An inverted right-handed coordinate frame is used, the X axis is positive forward, the Y axis is positive to the right, and the Z axis is positive downward. The source coordinate frame X, Y, Z is defined by the central axes of the orthogonal loops comprising the source antenna triad. The source coordinate frame is defined during installation of the sensor 12 in the work table 11.

The sensor coordinate frame $X_1, Y_1, Z_1$ is defined by the central axes of the three orthogonal loops comprising the sensor antenna triad. The sensor position is specified in rectangular (x,y,z) or spherical ($\alpha, \beta, \rho$) coordinates defined relative to the source coordinate frame. With reference to FIG. 6, it is illustrated that sensor orientation is specified by a sequence of three angular rotations. Azimuthal rotation ($\psi$) first turns the sensor about the Z' from X and Y to X' and Y'. The elevation rotation by $\theta$ turns the sensor about the Y' axis from Z' and X' to Z" and X". The roll rotation ($\phi$) turns the sensor about the X" axis from Y" and Z" to Y'" and Z'". In the zero orientation condition, the three sensor axes are parallel to the corresponding source axes. The order or sequence of the rotations cannot be interchanged without changing the values of $\psi$, $\theta$ and $\phi$.

Position and orientation are determined by solving for the six unknowns, i.e., $\alpha$, $\beta$, $\rho$, $\psi$, $\theta$ and $\phi$. This solution requires at least six independent measurements. The three axis transmitter and three axis receiver of the 3D digitizer generates three vectors at the source which provide nine equations to solve for the six unknowns. In general, any six of the nine equations can be used to solve for the six unknowns.

With reference to FIG. 7, if $\overline{V}_1$ is the amplitude and direction of the magnetic field vector, and $\overline{V}_2$ is the amplitude and direction of the magnetic field vector at some position P in the field, then:

$$\overline{V}_2 = \overline{T}\,\overline{V}_1 \tag{1}$$

or $$\begin{bmatrix} x_2 \\ y_2 \\ z_2 \end{bmatrix} = \overline{T} \begin{bmatrix} x_1 \\ y_1 \\ z_1 \end{bmatrix} \tag{2}$$

where $\overline{T}$ is the magnetic field transfer function which is a function of the coil geometry, the field shape and the position of $\overline{V}_2$:

$$\overline{T} = \frac{C}{\rho^3}\,\overline{T}_p^{-1} S \overline{T}_p \tag{3}$$

In Equa. (3) C is a constant and represents the specific characteristics of the coil, that is, coil diameter and the number of turns. $\rho$ is the range or distance between the sensor 15 and the source 12. $\overline{T}_P$ and $\overline{T}_P^{-1}$ are functions of the coil position and define the position of the coil in the field. If the coil is considered to be one of the sensor windings, $\overline{T}_P$ is a function of the two angles $\alpha$ and $\beta$ that define the position of the radiator in relation to the sensor.

If the sensor and source are perfectly aligned (the three axes are parallel to each other) S is defined as the field coupling between a sensor and a source in perfect alignment. When the source X axis is excited, the sensor picks up only along its $X_1$ axis. The sensor $Y_1$ and $Z_1$ axes are at right angles to the field and therefore do not pick up a signal. The same reasoning follows for the excitation of the source Y and Z axes. Therefore, $\overline{T}_P$ and $\overline{T}_P^{-1}$ relate to sensor rotations that deviate from the perfect sensor/source alignment situation.

With the aid of FIG. 8, the sensor transfer function can be developed. The heavy lines X and Z represent two axes of the sensor. For simplification, only the X and Z axes are illustrated. First consider the sensor at zero orientation, i.e., its azimuth elevation and roll angles are zero. The sensor is located at some position P in the magnetic field and the flux line 80, labelled "vector", includes the voltages in the coils. The voltage induced in the X axis is $X_1$ and the voltage induced in the Z axis is $Z_1$. Then, if the sensor is rotated through an elevational angle $\theta$ to a new position, the new induced voltages are $X_2$ and $Z_2$ which are trigonometric functions of the elevational angle $\theta$. An attitude transfer function $\overline{T}_A$ can thus be defined for the new sensor position that is a function of the azimuth, elevation and roll. The transfer function $\overline{T}_A$ relates a vector $\overline{V}_2$ measured by a sensor at some attitude $(\psi,\theta,\phi)$ to the vector $\overline{V}_1$ measured by a sensor at zero attitude:

$$\overline{V}_2 = \overline{T}_A\,\overline{V}_1 \tag{4}$$

or $$\begin{bmatrix} x_2 \\ y_2 \\ z_2 \end{bmatrix} = \overline{T}_A \begin{bmatrix} x_1 \\ y_1 \\ z_1 \end{bmatrix} \tag{5}$$

The transfer function $\overline{T}_A$ takes the form of a rotational sequence through the angles $\psi$, $\theta$, $\phi$; or:

$$\overline{T}_A = \overline{T}_\phi \overline{T}_\theta \overline{T}_\psi \tag{6}$$

If the sensor values at zero orientation are known, the sensor values can be computed at any sensor orientation by multiplying by $\overline{T}_A$.

FIG. 9 illustrates that the overall 3D digitizer computational strategy is based on the fact that if the output is known, the input can be found by providing the inverse of the transformation, i.e., if $\overline{V}_2$ equals $\overline{T}\,\overline{V}_1$, then $\overline{V}_1$ equals $\overline{T}^{-1}\,\overline{V}_2$. The transfer function $\overline{T}$ describes the length between the source and the sensor and is comprised of two parts:

$$\overline{T} = \overline{T}_{sensor} \overline{T}_{field} \tag{7}$$

The sensor transfer function describes the sensor at zero orientation and provides the signals at any other orientation. The field transfer function describes the sensor at zero attitude and provides the sensor signals anywhere in the field. Therefore, the transfer function $\overline{T}$ describes what the sensor receives for a given transmitted vector.

If the transfer function is not known exactly (the position and orientation parameters $\alpha$, $\beta$, $\rho$, $\psi$, $\theta$, and $\phi$ are not exactly known) then the transmitted vectors do not match the recovered vectors exactly. If the position and orientation of the sensor is known exactly then inserting these angles in the transfer function equation makes it possible to recover the transmitted vectors. Using the information that the transmitted and received vectors are not the same, it is possible to generate new errors indicating that the position and orientation of the sensor has not been estimated correctly. These new errors are used to improve the estimation of the transfer function and continue in an iterative fashion.

In FIG. 9, the transmitted vectors are represented by $f_0$ and are the excitation for the three-axis source. The sensor picks up the magnetic signals. The gain control tries to boost the signal in order to maintain a constant signal at the sensor. This block removes the $C/\rho^3$ factor in Equa. 3. After the signal has passed through electronic processing and been converted to a digital format, it reaches the analyzer 10 or central processing unit of the system.

The vectors sensed are the sensor transfer function $\overline{T}_S$ and the field transfer function $\overline{T}_f$. Mathematically, these inverse relationships are used to arrive at the value of S. If all of the transfer functions are estimated correctly, only S is left, which is the basic field coupling for the source and sensor when they are perfectly aligned. If the estimate is not correct, the value S is examined and error corrections are computed that are functions of the position and orientation errors. These errors are in the sensor frame. The errors measured in the sensor frame are then converted back to the source frame since this is where the position and orientation angles are defined. Once converted to the source frame, the errors are updated. The new estimates of the angles are equal to the old estimates plus the measured error. If the estimates of the position are not equal to the true position, a matrix develops terms which are functions of the position and orientation:

$$\overline{F_7} = \overline{T_p}\, \overline{T_A}^{-1}\, \overline{T_A}\, \overline{T_p}^{-1}\, S\, \overline{T_p}\, \overline{T_p}^{-1} \qquad (8)$$

or $$\overline{F_7} = \begin{bmatrix} 1 & \frac{3}{2}\Delta\alpha_0 - \frac{1}{2}\Delta\psi_0 & -\frac{3}{2}\Delta\beta_0 + \frac{1}{2}\Delta\theta_0 \\ \frac{3}{2}\Delta\alpha_0 - \Delta\psi_0 & -\frac{1}{2} & -\frac{1}{2}\Delta\phi_0 \\ -\frac{3}{2}\Delta\beta_0 + \Delta\theta_0 & \frac{1}{2}\Delta\phi_0 & -\frac{1}{2} \end{bmatrix} \qquad (9)$$

When all of the correct functions are arrived at, the restored tracking frame matrix with position and attitude errors, Equa. (9), reduces down to the perfect field coupling matrix which describes the sensor in a pure dipole field:

$$S = \begin{bmatrix} 1 & 0 & 0 \\ 0 & -\frac{1}{2} & 0 \\ 0 & 0 & -\frac{1}{2} \end{bmatrix} \qquad (10)$$

B. STYLUS CONSIDERATION

The equations for the relationship between the stylus point 35 with respect to the source reference frame follows. Discrepancies in the construction of the sensor stylus assembly are examined together with their effect on the basic coordinate equations.

FIG. 10 represents the relationship between a three-axis source and a corresponding three-axis sensor. The source 12 is located at the point 0 and defines the source reference frame X,Y,Z. The sensor 15 is located at the point 0' with spherical coordinates ($\alpha$, $\beta$, $\rho$) relative to the source coordinate frame. A sensor of zero orientation located at 0' will have its axis parallel to the axis of the source reference frame and will define the translated X',Y',Z' reference frame. If the sensor is then rotated with respect to the X',Y',Z' reference frame, the orientation can be described by the Euler sequence $\psi$, $\theta$, and $\phi$. The newly translated and rotated sensor axis can then be used to define the sensor reference frame X'',Y'',Z''.

Now consider a stylus of length L attached to the sensor and lying entirely along the X'' axis of the sensor reference frame. It is desired to represent the stylus point ($x''_p$, $y''_p$, $z''_p$) in terms of the source reference frame X,Y,Z.

Since the stylus lies along the X'' axis of the sensor reference frame, the point ($x''_p, y''_p, z''_p$) may be represented by the vector:

$$\overline{V}'' = \begin{bmatrix} L \\ 0 \\ 0 \end{bmatrix}$$

in the sensor frame X'',Y'',Z''. A sequence of derotations through the Euler angles $\phi$, $\theta$, $\psi$ applied to the vector $\overline{V}''$ results in a new vector $\overline{V}'$ representing the coordinates of the tip of the stylus measured in the reference frame X',Y',Z' which is parallel to but translated from the radiator reference frame. In matrix notation:

$$\overline{V}' = \overline{T}_{-\psi}\overline{T}_{-\theta}\overline{T}_{-\phi}\overline{V}'' \qquad (11)$$

where each of the matrices $T_{-\psi}$, $T_{-\theta}$ and $T_{-\phi}$ represent an inverse transformation through the respective Euler angle with:

$$\overline{T}_{-\phi} = \begin{bmatrix} 1 & 0 & 0 \\ 0 & \cos\phi & -\sin\phi \\ 0 & \sin\phi & \cos\phi \end{bmatrix} \qquad (12)$$

$$\overline{T}_{-\theta} = \begin{bmatrix} \cos\theta & 0 & \sin\theta \\ 0 & 1 & 0 \\ -\sin\theta & 0 & \cos\theta \end{bmatrix} \qquad (13)$$

$$\overline{T}_{-\psi} = \begin{bmatrix} \cos\psi & -\sin\psi & 0 \\ \sin\psi & \cos\psi & 0 \\ 0 & 0 & 1 \end{bmatrix} \qquad (14)$$

A translation of the vector $\overline{V}'$ to the X,Y,Z radiator reference frame is then given by:

$$\overline{V} = \overline{T}_v + \overline{V}' = \overline{T}_v + \overline{T}_{-\psi}\overline{T}_{-\theta}\overline{T}_{-\phi}\overline{V}'' \qquad (15)$$

$$\text{where } \overline{T}_v = \begin{bmatrix} \rho\cos\alpha\,\cos\beta \\ \rho\sin\alpha\,\cos\beta \\ -\rho\sin\beta \end{bmatrix}$$

represents the offset from the source to the sensor. Substituting Equa. (11)–(14) into Equa. (15) and expanding yields:

$$x_p = \rho \cos\alpha \cos\beta + L \cos\psi \cos\theta \qquad (16)$$

$$y_p = \rho \sin\alpha \cos\beta + L \sin\psi \cos\theta \qquad (17)$$

$$z_p = -\rho \sin\beta - L \sin\theta \qquad (18)$$

The point ($x_p, y_p, z_p$) represents the location of the tip of the stylus measured in the source reference frame.

C. SENSOR-STYLUS ASSEMBLY ERRORS

Equations (16)–(18) assume that there are no errors in the calculation of the system variables $\alpha$, $\beta$, $\rho$, $\psi$, $\theta$, and $\phi$ or in the relationship of the stylus and sensor.

Errors in the construction of the sensor-stylus assembly may originate from either:

(1) A positional offset of the center of the sensor with respect to the long axis of the stylus, or;

(2) An error in the orientation of the sensor with respect to the stylus axis.

FIG. 11 is a geometrical representation of each source of error. The X",Y",Z" coordinate system is the same as the sensor reference frame represented in FIG. 10. In the case of an ideal sensor-stylus assembly, the long axis of the sensor would lie entirely on the X" axis. The coordinates of the tip of the stylus would then be given by (L,O,O) measured in the sensor reference frame. In the case of a non-ideal sensor-stylus assembly, the coordinates of the stylus tip would be (L+$\Delta$x, $\Delta$y, $\Delta$z) where:

$$\Delta x = \Delta x_t + \Delta x_r \tag{19}$$

$$\Delta y = \Delta y_t + \Delta y_r \tag{20}$$

$$\Delta z = \Delta z_t + \Delta z_r \tag{21}$$

In these equations $\Delta x_t$, $\Delta y_t$, $\Delta z_t$ represent the contribution due to the offset error and $\Delta x_r$, $\Delta y_r$, $\Delta z_r$ represent the contribution from the orientation error in the sensor-stylus assembly.

In FIG. 11, the offset error is represented as a translation of the vector:

$$V'' = \begin{bmatrix} L \\ 0 \\ 0 \end{bmatrix}$$

to the point ($\Delta x_t$, $\Delta y_t$, $\Delta z_t$) measured in the sensor reference frame. This point defines the origin of a new coordinate system X''',Y''',Z'''. The axes of this system are parallel to the axis X",Y",Z" defining the sensor reference frame. Errors in the orientation of the sensor with respect to the long axis of the stylus can be represented as a rotation about the X''',Y''',Z''' axis. The rotation may be represented by the Euler angle sequence $\Delta\psi_1$, $\Delta\theta_1$, $\Delta\phi_1$ and defines a new coordinate system $X^{IV}$, $Y^{IV}$, $Z^{IV}$. The tip of the stylus is represented by the vector:

$$\begin{bmatrix} l \\ 0 \\ 0 \end{bmatrix}$$

in the translated and rotated coordinate system.
If the vector:

$$\begin{bmatrix} l \\ 0 \\ 0 \end{bmatrix}$$

as measured in the $X^{IV}$, $Y^{IV}$, $Z^{IV}$ coordinate system, is derotated through the Euler angle sequence $\Delta\psi$, $\Delta\theta$, $\Delta\phi$, then a new vector defining the tip of the stylus in the X''',Y''',Z''' reference frame results. The components of the new vector correspond to the rotational errors of Equations (19)-(21) and are given by:

$$\Delta x_r = l \cos \Delta\psi_1 \cos \Delta\theta_1 \tag{22}$$

$$\Delta y_r = l \sin \psi_1 \cos \Delta\theta_1 \tag{23}$$

$$\Delta z_r = -l \sin \Delta\theta_1 \tag{24}$$

Substituting Equations (22)-(24) into Equations (19)-(21) gives the errors of the sensor-stylus assembly measured in the sensor reference frame X",Y",Z", i.e.:

$$\Delta x = \Delta x_t + l \cos \Delta\psi_1 \cos \Delta\theta_1 \tag{25}$$

$$\Delta y = \Delta y_t + l \sin \Delta\psi_1 \cos \Delta\theta_1 \tag{26}$$

$$\Delta z = -l \sin \Delta\theta_1 \tag{27}$$

Therefore, using Equation (15) the coordinates of the non-ideal sensor measured in the radiator reference frame is given by:

$$\overline{V} = \overline{T}_v + \overline{T}_{-\psi}\overline{T}_{-\theta}\overline{T}_{-\phi} \begin{bmatrix} L + \Delta x \\ \Delta y \\ \Delta z \end{bmatrix} \tag{28}$$

D. SPASYN SYSTEM ERRORS

Equation (28) defines the coordinates of the tip of the stylus in the source reference frame under the assumption that no system errors exist in the calculation of the sensor position ($\alpha,\beta,\rho$) and orientation ($\psi,\theta,\phi$). Existence of errors in these calculations would yield position and orientation values of the form ($\alpha+\Delta\alpha$, $\beta+\Delta\beta$, $\rho+\Delta\rho$) and ($\psi+\Delta\psi$, $\theta+\Delta\theta$, $\phi+\Delta\phi$), respectively. These errors are carried into the calculation of the stylus point coordinate yielding:

$$V = T_{v+\Delta v} + T_{-(\psi+\Delta\psi)} T_{-(\theta+\Delta\theta)} T_{-(\phi+\Delta\phi)} \begin{bmatrix} L + \Delta X \\ \Delta Y \\ \Delta Z \end{bmatrix} \tag{29}$$

in place of Equation (28) where each system variable $\alpha,\beta,\rho,\psi,\theta,\phi$ is replaced by $\alpha+\Delta\alpha$, $\beta+\Delta\beta$, $\rho+\Delta\rho$, $\psi+\Delta\psi$, $\theta+\Delta\theta$ and $\phi+\Delta\phi$.

OPERATION

In recent years, solid modeling programs have been developed to enhance the design of components and the generation of object description databases. Systems are presently available for permitting a designer to create most simple objects through a series of keyboard commands. Nevertheless, inputting of complex shapes in such systems remains a difficult and costly process which generally requires significant engineering time, computer software and laborious hand measurements.

Many of these limitations in computer solid modeling techniques are overcome with the three dimensional digitizer of the present invention. In operation, the digitizer of the present invention determines the X, Y and Z coordinates of any point located on a low conductive, three dimensional model disposed on the model table 11, illustrated in FIGS. 1 and 3. This data, along with the orientation of the digitizer's stylus, is immediately available for transmission to a host computer or graphics terminal. Digitization is effected by simply touching the point to be measured with the tip of the hand held stylus 14.

A number of different operating modes are contemplated. In the point mode, the coordinates of a single point on the model are taken by placing the stylus at the point which is to be investigated and enabling the digitizer, through either a manual foot pad or keyboard switch command, or a command issued by the host computer. A run mode is also contemplated wherein a continuous output of stylus position is generated so that lines or surfaces can literally be sketched. In a track mode, this continuous indication of stylus position can be effected while an enable command is present from either the foot pad or keyboard switching means.

Physical objects or three dimensional models to be digitized are first placed on the work surface 25 atop the nonconductive table 11. This provides a reference plane for measuuring the model. The system is presently configured to measure the coordinates of a model up to 20×20×10 inches in size with an accuracy of one thirty-second of an inch or better. Smaller models can be digitized with greater accuracy and models as large as 50×50×20 inches can also be digitized with lesser accuracy. The stylus containing the sensor for measuring the transmitted field which is about the size of a pen and is shaped for hand use and the digitizing of concave as well as convex surfaces is simply traced over the three dimensional model. If labelling of data points is important, the keyboard unit 16 can also be used for instantaneous coding of the coordinates.

The electronics unit or analyzer 10 of the system contains all hardware and software essential to control digitizing operations. It consists of one or more analog boards and a digital processor. The analog boards contain circuitry to generate and sense the electromagnetic fields and digitize the sensed signals returned from the sensing antenna triad 15. The digital processor, a single board computer, controls the analog boards and performs all necessary computations. The analyzer 10 communicates with the outside world and host computer 20 through a standard interface between itself and the user's host computer or data terminal.

Once digitized, data points can be output in either discrete or continuous modes and the output is selectable in either an integer or floating point format. Positional data is calculated in X, Y and Z coordinates while orientation information can be determined either in directional, cosines or Euler angles. As many as fifty data points per second can be digitized and sent to the host computer or terminal.

The digitizer of the present invention has a wide number of applications and is a tool to improve productivity by rapidly digitizing objects and thus eliminating or substantially shortening a number of steps normally taken in the design process. Using the three dimensional digitizer of the present invention, designers of three dimensional shapes, whether they be components, assemblies, or machinery, can swiftly produce realistic images of preliminary designs. In most cases, the image will be of sufficient detail to both improve the design and simulate performance. Some applications to which the 3D digitizer of the present invention is thought to be particularly suited include the following:

A. BUILDING THREE DIMENSIONAL DATA BASES

The 3D digitizer of the present invention can be used to digitize solids in real time for input to computer generated imagery systems. In so doing, it eliminates the time consuming photogrammetric and model sectioning techniques necessary to reduce the model to two dimensions. Because the system's magnetic fields penetrate all low conductive materials, it is not limited by interference blockage or noise difficulties. While other X, Y, Z digitizers require a clear line of sight between sensors and detectors, the 3D digitizer of the present invention operates equally well among the various spatial layouts and components of shapes. Conversely, this system can function as a guidance aid, by directing its stylus to specific locations on the model.

B. GENERATING ENGINEERING DRAWINGS

The 3D digitizer of the present invention enables users to produce isometric drawings directly from three dimensional models. By automating the measurement of piping and component dimensions, the digitizer produces significant labor-savings over manual input techniques and with appropriate software, can be used to generate a wide variety of engineering drawings and materials list.

C. ANIMATING GRAPHICS

The 3D digitizer of the present invention permits users to interact with computer generated imagery. The six degree of freedom stylus can be used to direct the real time movement and rotation of resident images.

D. CREATING VIDEO ART

The 3D digitizer can also create video art as a function of the orientation and position of its stylus. The stylus can also be used as a paintbrush, knife or chisel to create video painting or sculpture.

These applications are by no means inclusive, they are presented here to demonstrate the versatility of the three dimensional digitizer of the present invention. In general, the system has application wherever designers contemplate doing in three dimensions what is presently restricted to two dimensions.

The above description should be considered as exemplary and that of the preferred embodiment only. Modifications of the invention will occur to those who make and use the invention. It is desired to include all such modifications within the scope of this patent. The true spirit and scope of the present invention should be determined by reference to the appended claims. It is desired to include within the appended claims all such modifications of the invention that come within their proper scope.

The embodiments of the invention in which an exclusive property or privilege is claimed are defined as follows:

1. A three dimensional digitizer for establishing a digital database comprising:
  a plurality of radiating means for radiating electromagnetic energy, said radiating means having independent components defining a reference coordinate frame;
  a transmitter means for applying to said plurality of radiating means electrical signals which generate a plurality of radio frequency electromagnetic fields, said electromagnetic fields being distinguishable from one another;
  a means for identifying the coordinates to be digitized;
  a plurality of receiving means for receiving said transmitted electromagnetic fields, said receiving means being disposed on said means for identifying and said receiving means having a plurality of independent components for detecting each of said transmitted electromagnetic fields; and
  analyzing means for receiving the output of said receiving means and converting the components of said transmitted electromagnetic fields received by said receiving means into receiving means position and orientation, and thus determining the coordinates to be digitized and compensating for any offset between said means for identifying and said receiving means.

2. The three dimensional digitizer of claim 1 wherein said means for identifying comprises a stylus provided with a projection for defining a point of contact between said stylus and the surface of a three dimensional object, and said plurality of receiving means are provided with a known relationship with said point of contact.

3. The three dimensional digitizer of claim 1 further comprising a nonconductive table for defining a work surface upon which a three dimensional object is placed for tracing and digitizing.

4. The three dimensional digitizer of claim 3 wherein said plurality of radiating means which define a reference coordinate frame are disposed on said nonconductive table below said work surface.

5. The three dimensional digitizer of claim 3 further comprising a foot pad switching means disposed below said work surface, said foot pad switching means being connected to said analyzing means for enabling the digitizing of the coordinates of a three dimensional object touched by said means for identifying.

6. The three dimensional digitizer of claim 1 further comprising a keyboard switching means connected to said analyzing means for enabling the digitizing of the coordinates of a three dimensional object and labelling the coordinates for further reference.

7. The three dimensional digitizer of claim 2 wherein said stylus further comprises a tip and a stem, said projection being disposed on said tip and said tip being removably mounted on said stem, said stem and said tip forming a hand manipulable stylus suitable for use in the hand of a user in a pen-like fashion.

8. The three dimensional digitizer of claim 7 wherein said stylus further comprises a sensor assembly, said plurality of receiving means being disposed on said sensor assembly, said sensor assembly being housed within said stem and said stem further including means for making ohmic contact with each of said receiving means.

9. The three dimensional digitizer of claim 1 wherein each of said plurality of radiating means and said plurality of receiving means comprises a loop antenna, each of said plurality of radiating means defining a magnetic dipole field.

10. The three dimensional digitizer of claim 1 further comprising means for operating said transmitter means and said plurality of receiving means in a closed loop.

11. The three dimensional digitizer of claim 1 wherein said analyzing means further comprises means for determining the position and orientation of said plurality of receiving means in an iterative manner.

12. A three dimensional digitizer for determining the coordinates in a three dimensional object comprising:
a plurality of radiating means for radiating electromagnetic energy, said radiating means having independent components defining a reference coordinate frame, each of said radiating means comprising a loop antenna for establishing a dipole magnetic field;
a transmitter means for applying to said plurality of radiating means electrical signals which generate a plurality of dipole magnetic fields, said electrical signals being multiplexed and said magnetic fields being distinguishable from one another;
a stylus for tracing the surface of a three dimensional object;
a plurality of receiving means for receiving said transmitted electromagnetic fields, said receiving means being disposed on said stylus and having a plurality of independent components for detecting each of said transmitted magnetic fields, each of said receiving means comprising a loop antenna; and
analyzing means for receiving the output of said receiving means and converting the components of said transmitted magnetic fields received by said receiving means into receiving means position and orientation and thus determining the coordinates of the surface of a three dimensional object touched by said stylus while compensating for any offset between said stylus and said receiving means.

13. A three dimensional digitizer for determining the coordinates of a three dimensional object comprising:
a plurality of radiating means for radiating electromagnetic energy, said radiating means having independent components defining a reference coordinate frame, each of said receiving means comprising a loop antenna for establishing a dipole magnetic field;
a transmitter means for applying to said plurality of radiating means electrical signals which generate a plurality of dipole magnetic fields, said electrical signals being multiplexed and said magnetic fields distinguishable from one another;
a stylus for tracing the surface of a three dimensional object, said stylus being provided with a projection for defining a point of contact between said stylus and the surface of a three dimensional object;
a plurality of receiving means for receiving said transmitted electromagnetic fields, said receiving means being disposed on said stylus and having a plurality of independent components for detecting each of said transmitted magnetic fields, each of said receiving means comprising a loop antenna, said plurality of receiving means having a predetermined known relationship with said point of contact;
analyzing means for receiving the output of said receiving means and converting the components of said transmitted magnetic fields received by said receiving means into receiving means position and orientation and thus determining the coordinates of the surface of a three dimensional object touched by said stylus while compensating for any offset between said projection and said receiving means; and
switching means connected to said analyzing means for enabling the digitizing of the coordinates of a three dimensional object touched by said stylus.

14. The three dimensional digitizer of claim 2, 12 or 13 wherein said point of contact between said stylus and the surface of a three dimensional object is represented by a vector $\overline{V}$ in said reference coordinate frame where:

$$\overline{V} = \overline{T}_v + \overline{T}_{-\psi}\overline{T}_{-\theta}\overline{T}_{-\phi} \begin{bmatrix} L + \Delta x \\ \Delta y \\ \Delta z \end{bmatrix}$$

and;
$\overline{T}_v$ is a vector representative of the coordinates of said receiving means relative to said radiating means;

$T_{-\psi}$, $T_{-\theta}$ and $T_{-\phi}$ are transfer functions representative of the orientation angles of said receiving means relative to said radiating means;

L is the nominal length of said stylus; and $\Delta X$, $\Delta Y$ and $\Delta Z$ are offsets between said means for identifying and said receiving means in the X, Y and Z directions, respectively.

15. A three dimensional digitizer for establishing a digital database comprising:

a plurality of radiating means for radiating electromagnetic energy, said radiating means having independent components defining a reference coordinate frame;

a transmitter means for applying to said plurality of radiating means electrical signals which generate a plurality of radio frequency electromagnetic fields, said electromagnetic fields being distinguishable from one another;

a means for identifying the coordinates to be digitized;

a plurality of receiving means for receiving said transmitted electromagnetic fields, said receiving means being disposed on said means for identifying and said receiving means having a plurality of independent components for detecting each of said transmitted electromagnetic fields; and analyzing means for receiving the output of said receiving means and converting the components of said transmitted electromagnetic fields received by said receiving means into receiving means position and orientation, and determining the coordinates to be digitized, the coordinates to be digitized being represented by a vector V in said reference coordinate frame where:

$$\overline{V} = \overline{T}_\nu + \overline{T}_{-\psi}\overline{T}_{-\theta}\overline{T}_{-\phi} \begin{bmatrix} \Delta x \\ \Delta y \\ \Delta z \end{bmatrix}$$

and;

$T_\nu$ is a vector representative of the coordinates of said receiving means relative to said radiating means;

$T_{-\psi}$, $T_{-\theta}$ are transfer functions representative of the orientation angles of said receiving means relative to said radiating means; and $\Delta X$, $\Delta Y$ and $\Delta Z$ are offsets between said means for identifying and said receiving means in the X, Y and Z directions, respectively.

16. The three dimensional digitizer of claim 15 wherein said means for identifying comprises a stylus provided with a projection for defining a point of contact between said stylus and the surface of a three dimensional object, and said plurality of receiving means are provided with a known relationship with said point of contact.

17. The three dimensional digitizer of claim 15 further comprising a nonconductive table for defining a work surface upon which a three dimensional object is placed for tracing and digitizing.

18. The three dimensional digitizer of claim 17 wherein said plurality of radiating means which define a reference coordinate frame are disposed on said nonconductive table below said work surface.

19. The three dimensional digitizer of claim 17 further comprising a foot pad switching means disposed below said work surface, said foot pad switching means being connected to said analyzing means for enabling the digitizing of the coordinates of a three dimensional object touched by said means for identifying.

20. The three dimensional digitizer of claim 15 further comprising a keyboard switching means connected to said analyzing means for enabling the digitizing of the coordinates of a three dimensional object and labelling the coordinates for further reference.

21. The three dimensional digitizer of claim 16 wherein said stylus further comprises a tip and a stem, said projection being disposed on said tip and said tip being removably mounted on said stem, said stem and said tip forming a hand manipulable stylus suitable for use in the hand of a user in a pen-like fashion.

22. The three dimensional digitizer of claim 21 wherein said stylus further comprises a sensor assembly, said plurality of receiving means being disposed on said sensor assembly, said sensor assembly being housed within said stem and said stem further including means for making ohmic contact with each of said receiving means.

23. The three dimensional digitizer of claim 15 wherein each of said plurality of radiating means and said plurality of receiving means comprises a loop antenna, each of said plurality of radiating means defining a magnetic dipole field.

24. The three dimensional digitizer of claim 15 further comprising means for operating said transmitter means and said plurality of receiving means in a closed loop.

25. The three dimensional digitizer of claim 15 wherein said analyzing means further comprises means for determining the position and orientation of said plurality of receiving means in an iterative manner.

26. A three dimensional digitizer for determining the coordinates of a three dimensional object comprising:

a plurality of radiating means for radiating electromagnetic energy, said radiating means having independent components defining a reference coordinate frame;

a transmitter means for applying to said plurality of radiating means electrical signals which generate a plurality of radio frequency electromagnetic fields, said electromagnetic fields being distinguishable from one another;

a stylus for tracing the surface of a three dimensional object, said stylus being provided with a projection for defining a point of contact with the surface of a three dimensional object;

a plurality of receiving means for receiving said transmitted electromagnetic fields, said receiving means being disposed on said stylus and said receiving means having a plurality of independent components for detecting each of said transmitted electromagnetic fields, said receiving means being disposed a nominal distance L from said projection of said stylus; and analyzing means for receiving the output of said receiving means and converting the components of said transmitted electromagnetic fields received by said receiving means into receiving means position and orientation, and determining the coordinates of the surface of a three dimensional object touched by said stylus, the surface of a three dimensional object being represented by a vector $\overline{V}$ in said reference coordinate frame where:

$$\overline{V} = \overline{T}_\nu + \overline{T}_{-\psi}\overline{T}_{-\theta}\overline{T}_{-\phi}\begin{bmatrix} L + \Delta x \\ \Delta y \\ \Delta z \end{bmatrix}$$

and;

$\overline{T}_\nu$ is a vector representative of the coordinates of said receiving means relative to said radiating means;

$T_{-\psi}$, $T_{-\theta}$ and $T_{-\phi}$ are transfer functions representative of the orientation angles of said receiving means relative to said radiating means; and $\Delta X$, $\Delta Y$ and $\Delta Z$ are offsets between a stylus tip and said receiving means in the X, Y and Z directions, respectively.

27. The three dimensional digitizer of claim 26 further comprising a nonconductive table for defining a work surface upon which a three dimensional object is placed for tracing and digitizing.

28. The three dimensional digitizer of claim 27 wherein said plurality of radiating means which define a reference coordinate frame are disposed on said nonconductive table below said work surface.

29. The three dimensional digitizer of claim 27 further comprising a foot pad switching means disposed below said work surface, said foot pad switching means being connected to said analyzing means for enabling the digitizing of the coordinates of a three dimensional object touched by said stylus.

30. The three dimensional digitizer of claim 26 further comprising a keyboard switching means connected to said analyzing means for enabling the digitizing of the coordinates of a three dimensional object and labelling the coordinates for further reference.

31. The three dimensional digitizer of claim 26 wherein said stylus further comprises a tip and a stem, said projection being disposed on said tip and said tip being removably mounted on said stem, said stem and said tip forming a hand manipulable stylus suitable for use in the hand of a user in a pen-like fashion.

32. The three dimensional digitizer of claim 31 wherein said stylus further comprises a sensor assembly, said plurality of receiving means being disposed on said sensor assembly, said sensor assembly being housed within said stem and said stem further including means for making ohmic contact with each of said receiving means.

33. The three dimensional digitizer of claim 26 wherein each of said plurality of radiating means and said plurality of receiving means comprises a loop antenna, each of said plurality of radiating means defining a magnetic dipole field.

34. The three dimensional digitizer of claim 26 further comprising means for operating said transmitter means and said plurality of receiving means in a closed loop.

35. The three dimensional digitizer of claim 26 wherein said analyzing means further comprises means for determining the position and orientation of said plurality of receiving means in an iterative manner.

* * * * *